Jan. 1, 1963     H. J. WALTER     3,071,041
AUTOMATIC LENS FOCUS MEANS
Filed Feb. 18, 1960
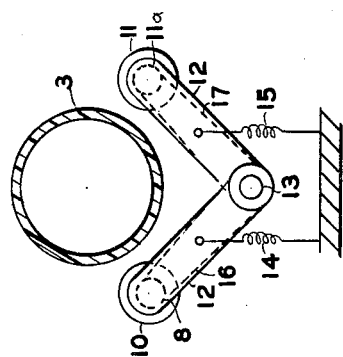
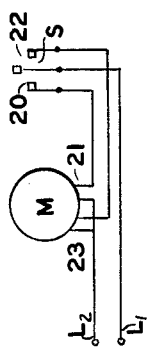
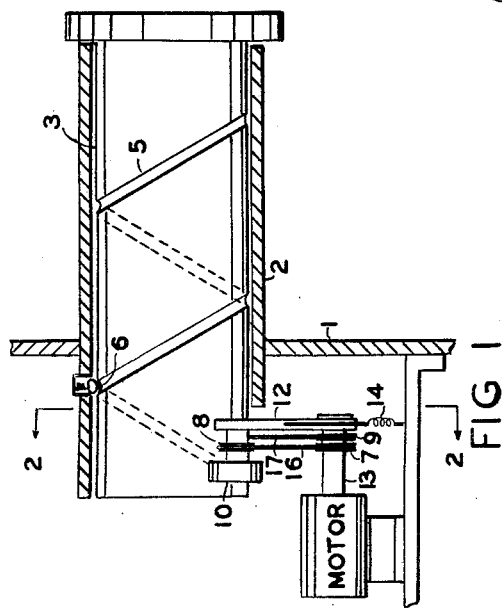
INVENTOR.
HENRY J. WALTER
BY

United States Patent Office 3,071,041
Patented Jan. 1, 1963

3,071,041
AUTOMATIC LENS FOCUS MEANS
Henry J. Walter, Bethpage, N.Y., assignor to
Viewlex, Inc., Long Island, N.Y.
Filed Feb. 18, 1960, Ser. No. 9,520
1 Claim. (Cl. 88—24)

This invention relates to means to focus the lens of a projector and more particularly to controlled motor driven means for such purpose.

In projectors of the type using slides or strip film different slides are quite likely to be out of focus due to different thicknesses of or bending of slide mountings, as only two or three thousandths of an inch deviation from the correct plane will cause an objectionable out-of-focus condition.

Projectors of this type are generally manually focused so that if an accurate focus is needed it may be necessary to adjust the lens for each particular slide. This is a tedious and time consuming operation which defeats the enjoyment of the viewing.

This type projector generally has the lens mounted in a barrel which contains a helical groove, the barrels fitting in a corresponding barrel on a projector frame. A spring loaded detent type projection is mounted on the projector mounting and adapted to ride in a groove so that as the lens barrel is rotated, it is also moving axially for focusing. This type construction is generally used as the lens barrels are easily removed.

The present invention provides motor driven means for turning this type lens barrel comprising a pair of rollers mounted on a bracket having two legs. The bracket pivots about the motor axis and the rollers are connected to the motor shaft through separate belts. When the motor turns in one direction one roller will contact the lens barrel to drive it in a first direction and when the motor turns in the opposite direction the other roller will contact the lens barrel to drive it in the other direction. Suitable switching arrangements are provided so that the motor may be operated by a pair of push buttons or spring loaded double throw switch. The operator merely presses one button or the other until the picture comes into the proper focus. The roller drive mounting is provided so the conventional lens barrels may be used without any modification and so that lenses may be easily removed from the projector.

Accordingly, a principal object of the invention is to provide new and improved lens focusing means.

Another object of the invention is to provide new and improved motor driven lens focusing means.

Another object of the invention is to provide new and improved motor driven lens focusing means which may be operated from a remote location.

Another object of the invention is to provide new and improved lens focusing means for projection lenses without requiring any modification of the lens mounting.

These and other objects of the invention will be apparent from the following specification and drawings, of which:

FIG. 1 is a side view partially in section of an embodiment of the invention,

FIG. 2 is a view of the embodiment of FIG. 1 along the line 2—2 of FIG. 1,

FIG. 3 is a schematic diagram of the switching circuit.

Referring to the figures, the projector 1 has a barrel type mounting 2 for receiving the lens and its barrel 3 into the projector. The lens mounting 3 is generally a hollow plastic cylinder or barrel having a spiral groove 5 cut in its outside surface. Mounted in the projector is a spring loaded projection or detent 6 which rides in the groove 5 so that when the lens barrel 3 is rotated manually it will also move axially for focusing.

The apparatus thus far described is conventional. The motor controlled drive of the present invention comprises a pair of friction rollers 10 and 11 which are rotatably mounted on a bracket 12 which may be a right angle bracket, the arms being fixed together at an angle. The bracket 12 is pivotally mounted with a free fit on the motor shaft 13. The bracket 12 is spring loaded by the springs 14 and 15 so that its neutral position is as shown in FIG. 2.

The rollers 10 and 11 are driven by a pair of belts 16 and 17 which are mounted on pulleys 7 and 9 connected to the motor shaft and pulley 8 connected to roller 10 and a pulley 11a connected to roller 11.

Therefore when the motor shaft 13 is driven in a counterclockwise direction the bracket 12 will rotate counterclockwise bringing the roller 11 in direct contact with the lens barrel 3 and rotating the lens barrel in a clockwise direction. The belt 17 must be mounted tight enough to pivot the bracket to provide this type operation.

The belt 16 and roller 10 operate in the same manner when the motor shaft turns clockwise to rotate the lens barrel in the opposite direction.

When the motor shaft is not turning then the bracket will assume the neutral position shown in FIG. 2 permitting easy removal of the lens barrel. Alternatively, the system may be used with the rollers omitted and having the drive belts contact the lens barrel, giving more contact surface, and better driving torque.

FIG. 3 shows a circuit diagram. The motor M is of any conventional reversible type, for instance, one having two windings, one for each direction. With such a motor one side of the line L1 is connected through the left contact 20 of the switch S through the clockwise winding 21 of the motor to the other side of the line L2. In the right hand position 22 of the switch the circuit is completed through the other or counterclockwise winding 23 of the motor. Alternatively, a D.C. motor can be used and the polarity reversed.

The device is operated by merely holding the switch blade to one side or the other until the proper focus is obtained. Alternatively, two push buttons or other switching arrangements could be made.

Therefore the present invention provides new and improved means for focusing a conventional projector lens without any modifications to the lens and without interfering with the easy removal and interchangeability of the lens barrels.

Many modifications will occur to those desirous of practicing this invention without departing from the scope thereof which is defined by the following claim.

I claim:

Motorized focusing means for a conventional projector lens of the type mounted in a barrel and having a helical groove which is engaged by a stationary projection on the projector comprising a pair of rollers adapted to come in contact with said barrel to rotate said barrel, reversible motor means, a bracket having two arms, one of said rollers being mounted at the end of each of said arms said bracket being pivotally mounted on the motor shaft axis and means connecting said motor shaft with said rollers.

References Cited in the file of this patent
UNITED STATES PATENTS 1,271,929   Nelson _____ July 9, 1918